United States Patent
Georgis et al.

(10) Patent No.: US 11,450,053 B1
(45) Date of Patent: Sep. 20, 2022

(54) EFFICIENT 5G TRANSMISSION OF VOLUMETRIC DATA USING 3D CHARACTER RIGGING TECHNIQUES

(71) Applicant: SONY GROUP CORPORATION, Tokyo (JP)

(72) Inventors: Nikolaos Georgis, San Diego, CA (US); Marc Birnkrant, Poway, CA (US)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/229,399

(22) Filed: Apr. 13, 2021

(51) Int. Cl.
*G06T 13/40* (2011.01)
*G06T 17/00* (2006.01)

(52) U.S. Cl.
CPC .............. *G06T 13/40* (2013.01); *G06T 17/00* (2013.01)

(58) Field of Classification Search
CPC ............ G06T 13/40; G06T 17/00; G06T 2207/10136; G06T 2207/30044; G06T 2207/30196; G06T 2207/10012; G06T 7/149; G06T 13/00; G06T 15/503; G06T 19/006; G06T 2207/20228; G06T 7/97; A61B 8/466; A61B 8/483; A61B 8/5253; A61B 6/466; G01S 15/8993; G01S 15/8995; G01S 7/52087
See application file for complete search history.

(56) References Cited

U.S. PATENT DOCUMENTS

| | | | | |
|---|---|---|---|---|
| 11,069,153 | B1* | 7/2021 | Bassett | B33Y 50/00 |
| 2011/0304634 | A1* | 12/2011 | Urbach | G06F 9/5016 |
| | | | | 345/501 |
| 2016/0107380 | A1* | 4/2016 | Smoot | B29C 64/124 |
| | | | | 264/401 |
| 2019/0117186 | A1* | 4/2019 | Klinder | G01S 7/52098 |
| 2020/0312011 | A1 | 10/2020 | Koepeinigg et al. | |
| 2021/0049802 | A1* | 2/2021 | Luo | G06T 13/80 |
| 2021/0248801 | A1* | 8/2021 | Li | G06T 13/40 |

FOREIGN PATENT DOCUMENTS

KR 20200030947 A * 9/2018 ............. G06T 7/277

OTHER PUBLICATIONS

Li, Anna Qingfeng et al., "Enabling High Quality Volumetric VOD Streaming Over Broadband and 5G", White Paper, Intel.

* cited by examiner

*Primary Examiner* — Abderrahim Merouan
(74) *Attorney, Agent, or Firm* — Haverstock & Owens, A Law Corporation

(57) ABSTRACT

Efficient 5G transmission of volumetric data using 3D character rigging techniques is able to be achieved by capturing volumetric data using RGB, depth or other special purpose cameras or sensors, reconstructing in 3D and then performing character rigging. The ability to render future or novel frames using rigging is able to be used in order to predict future and past models. By sending the rigging vectors and the compressed errors of difference between actual and predicted models, higher compression rates of volumetric sequences are able to be achieved compared to traditional methods. The decoder on the other side of the 5G channel reverses the process to synthesize original frames.

20 Claims, 3 Drawing Sheets

EFFICIENT 5G TRANSMISSION OF VOLUMETRIC DATA USING 3D CHARACTER RIGGING TECHNIQUES

FIELD OF THE INVENTION

The present invention relates to three dimensional graphics. More specifically, the present invention relates to compression of three dimensional graphics.

BACKGROUND OF THE INVENTION

A $5^{th}$ generation mobile network is being developed, referred to as 5G. The 5G network is designed to connect virtually everyone and everything together including device and machines not previously connected. The 5G network, like any network, can only handle a limited amount of data. Thus, sending large amounts of data over the network could lead to issues. Since volumetric 3D content includes large amounts of data, transmitting volumetric 3D content inefficiently could cause bandwidth issues.

SUMMARY OF THE INVENTION

Efficient 5G transmission of volumetric data using 3D character rigging techniques is able to be achieved by capturing volumetric data using RGB, depth or other special purpose cameras or sensors, reconstructing in 3D and then performing character rigging. The ability to render future or novel frames using rigging is able to be used in order to predict future and past models. By sending the rigging vectors and the compressed errors of difference between actual and predicted models, higher compression rates of volumetric sequences are able to be achieved compared to traditional methods. The decoder on the other side of the 5G channel reverses the process to synthesize original frames.

In one aspect, a method programmed in a non-transitory memory of a device comprises generating a plurality of 3D models from frames of volumetric 3D content, synthesizing frame models from the plurality of 3D models, comparing the synthesized frame models with the plurality of 3D models to calculate difference information between the synthesized frame models and the 3D models and transmitting a first 3D model of the plurality of 3D models, the difference information and parameters to a server. The method further comprises acquiring the volumetric 3D content. Synthesizing the frame models from the plurality of 3D models further comprises accepting coefficients and the parameters from the frames to synthesize the frame models from the plurality of 3D models. Generating the plurality of 3D models includes: generating the first 3D model from a first frame of the volumetric 3D content and generating a second 3D model from a second frame of the volumetric 3D content. Accepting coefficients and the parameters from the frames to synthesize the frame models includes: accepting the coefficients and the parameters from the frames at a rigging engine, and using an optimizer to synthesize a second frame model from the first 3D model. The server is further configured for utilizing rigging to re-generate the volumetric 3D content. The server is further configured for synthesizing a second frame model and additional frame models to re-generate the volumetric 3D content.

In another aspect, an apparatus comprises a non-transitory memory for storing an application, the application for: generating a plurality of 3D models from frames of volumetric 3D content, synthesizing frame models from the plurality of 3D models, comparing the synthesized frame models with the plurality of 3D models to calculate difference information between the synthesized frame models and the 3D models and transmitting a first 3D model of the plurality of 3D models, the difference information and parameters to a server and a processor coupled to the memory, the processor configured for processing the application. The apparatus wherein the application is further configured for acquiring the volumetric 3D content. Synthesizing the frame models from the plurality of 3D models further comprises accepting coefficients and the parameters from the frames to synthesize the frame models from the plurality of 3D models. Generating the plurality of 3D models includes: generating the first 3D model from a first frame of the volumetric 3D content and generating a second 3D model from a second frame of the volumetric 3D content. Accepting coefficients and the parameters from the frames to synthesize the frame models includes: accepting the coefficients and the parameters from the frames at a rigging engine, and using an optimizer to synthesize a second frame model from the first 3D model. The server is further configured for utilizing rigging to re-generate the volumetric 3D content. The server is further configured for synthesizing a second frame model and additional frame models to re-generate the volumetric 3D content.

In another aspect, a system comprises a first computing device configured for: generating a plurality of 3D models from frames of volumetric 3D content, synthesizing frame models from the plurality of 3D models, comparing the synthesized frame models with the plurality of 3D models to calculate difference information between the synthesized frame models and the 3D models and transmitting a first 3D model of the plurality of 3D models, the difference information and parameters and a second computing device configured for: receiving the first model, difference information and the parameters and utilizing rigging to re-generate the volumetric 3D content. The system further comprises set of cameras configured for acquiring the volumetric 3D content. Synthesizing the frame models from the plurality of 3D models further comprises accepting coefficients and the parameters from the frames to synthesize the frame models from the plurality of 3D models. Generating the plurality of 3D models includes: generating the first 3D model from a first frame of the volumetric 3D content and generating a second 3D model from a second frame of the volumetric 3D content. Accepting coefficients and the parameters from the frames to synthesize the frame models includes: accepting the coefficients and the parameters from the frames at a rigging engine, and using an optimizer to synthesize a second frame model from the first 3D model. The server is further configured for synthesizing a second frame model and additional frame models to re-generate the volumetric 3D content.

DETAILED DESCRIPTION OF THE PREFERRED EMBODIMENT

Efficient 5G transmission of volumetric data using 3D character rigging techniques is able to be achieved by capturing volumetric data using RGB, depth or other special purpose cameras or sensors, reconstructing in 3D and then performing character rigging. The ability to render future or novel frames using rigging is able to be used in order to predict future and past models. By sending the rigging vectors and the compressed errors of difference between actual and predicted models, higher compression rates of volumetric sequences are able to be achieved compared to traditional methods. The decoder on the other side of the 5G channel reverses the process to synthesize original frames.

Rigging is animating a static 3D model (e.g., in a T or Y position) to a different position. The static 3D model is able to be captured by one or more cameras positioned around a subject. Rigging involves determining control points (e.g., body parts such as neck, elbows, knees) and with computer graphics, a 3D model is able to be animated. For example, a set of cameras acquire volumetric 3D content which is used to generate a static 3D model of a person standing with her arms out, and then the person is able to be animated to be playing tennis, dancing or jumping using a computer graphics implementation.

A moving 3D model is able to be captured (e.g., in a video) using one or more cameras around the subject, and then using motion prediction and temporal compression, where only the difference between frames is sent to a server or other remote device. For example, a rigging vector is transmitted from a local/client device to a server device. Furthering the example, from the first frame to the second frame, the subject does not move, so the rigging vector is able to be all zeroes to indicate no movement, but from the second frame to the third frame, the subject only moves his hand, so only the information related to the hand movement is sent instead of sending the information related to the full subject. The rigging vector is transmitted between each frame, and the server is able to use rigging to approximate an optimal set of vectors for the next frame to show the movement. This drastically reduces the amount of bandwidth utilized (e.g., amount of data sent over the network).

Figure 1:
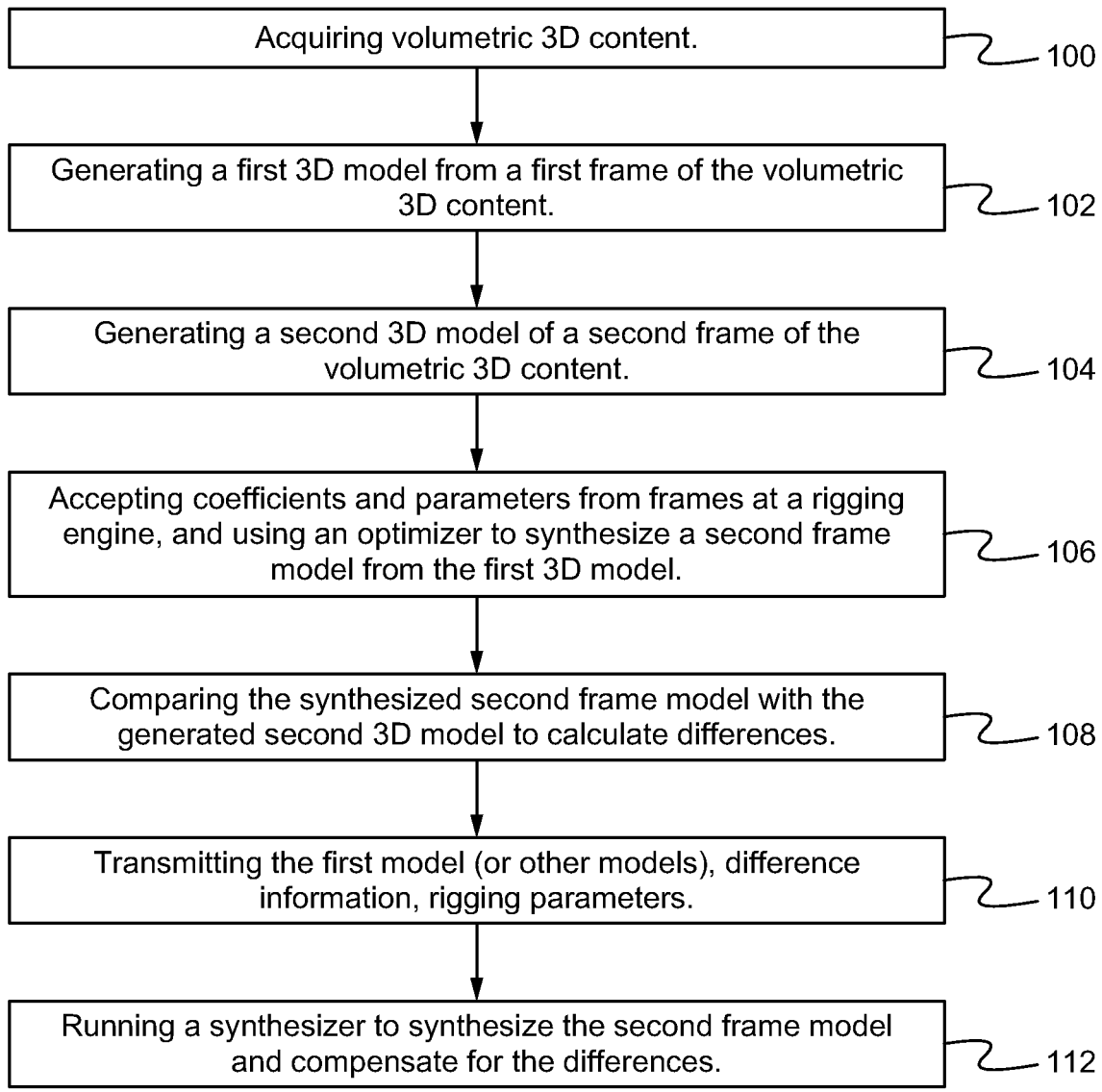
FIG. 1 illustrates a flowchart of a method of implementing transmission of volumetric data using 3D character rigging according to some embodiments.

FIG. 1 illustrates a flowchart of a method of implementing transmission of volumetric data using 3D character rigging according to some embodiments. In the step 100, volumetric 3D content is acquired using one or more cameras or sensors. The volumetric 3D content is able to include images and/or videos. For example, the volumetric 3D content is a video which comprises frames (e.g., 30 or 60 frames per second). In the step 102, a first 3D model is generated from a first frame of the volumetric 3D content. In the step 104, a second 3D model is generated from a second frame of the volumetric 3D content. The 3D models are able to be generated using any implementation. In the step 106, a rigging engine accepts/acquires/determines coefficients and parameters from the frames and uses an optimizer to synthesize a second frame model from the first 3D model. In the step 108, the synthesized second frame model is compared with the generated second 3D model to calculate differences between the models. In the step 110, the first model (or another model), difference information and/or the parameters for the rigging engine (e.g., rigging parameters) are transmitted to a server (e.g., receiver or remote device), so the server receives the first model (or another model), difference information and/or the rigging parameters (e.g., a rigging vector). In the step 112, the server runs a synthesizer to synthesize the second frame model (or another frame model) and compensate for the differences. The process repeats for the frames of the volumetric 3D content to transmit/re-generate the entire volumetric 3D content. In an example, with 30 frames per second, there are 30 volumetric 3D models generated per second. Each frame/3D model uses prior frame/3D model information to perform the transmission/synthesis/re-generation of the volumetric 3D content. In other words, the server implements rigging to re-generate the volumetric 3D content. In some embodiments, the order of the steps is modified. In some embodiments, fewer or additional steps are implemented.

Figure 2:
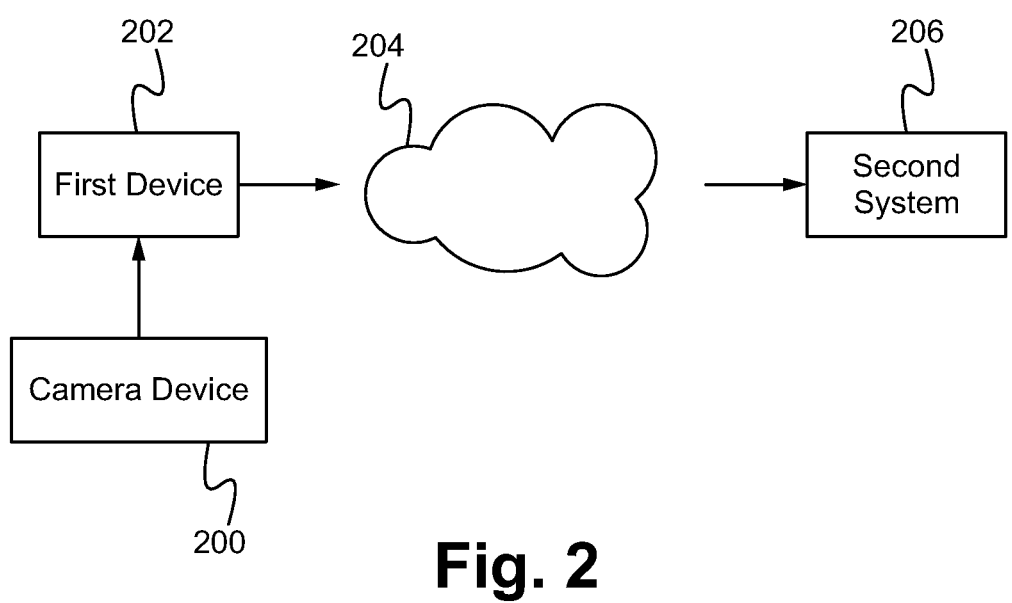
FIG. 2 illustrates a diagram of an efficient transmission system according to some embodiments.

FIG. 2 illustrates a diagram of an efficient transmission system according to some embodiments. One or more camera devices 200 acquire 3D volumetric content. A first device 202 (e.g., an encoder, a transmitter) is configured to process and transmit 3D volumetric content. The first device 202 is able to include or communicate with the one or more camera devices 200. The first device 202 includes any components to perform the efficient transmission implementation described herein such as a rigging engine configured to accept coefficients and parameters from the frames of video content and configured to use an optimizer to synthesize frame models from prior 3D models. The first device 202 is configured to transmit 3D model information, 3D model difference information, coefficients and parameters to a second device 204 (e.g., a decoder, a receiver). The second device 204 includes any components to perform the efficient transmission implementation described herein such as a rigging engine configured to accept coefficients and parameters from the frames of video content and configured to use an optimizer to synthesize frame models from prior 3D models. The second device 204 is configured to receive 3D model information, 3D model difference information, coefficients and parameters from the first device 202. The second device 204 is configured re-generate the 3D volumetric content. The transmitted information (e.g., 3D model information, difference information, coefficients, and parameters) is able to be communicated directly to the second device 204 or over a network 206. The network 206 is able to be any type of network such as a Local Area Network (LAN), the Internet, a wireless network, a wired network, a cellular network, and/or any other network or combination of networks.

Figure 3:
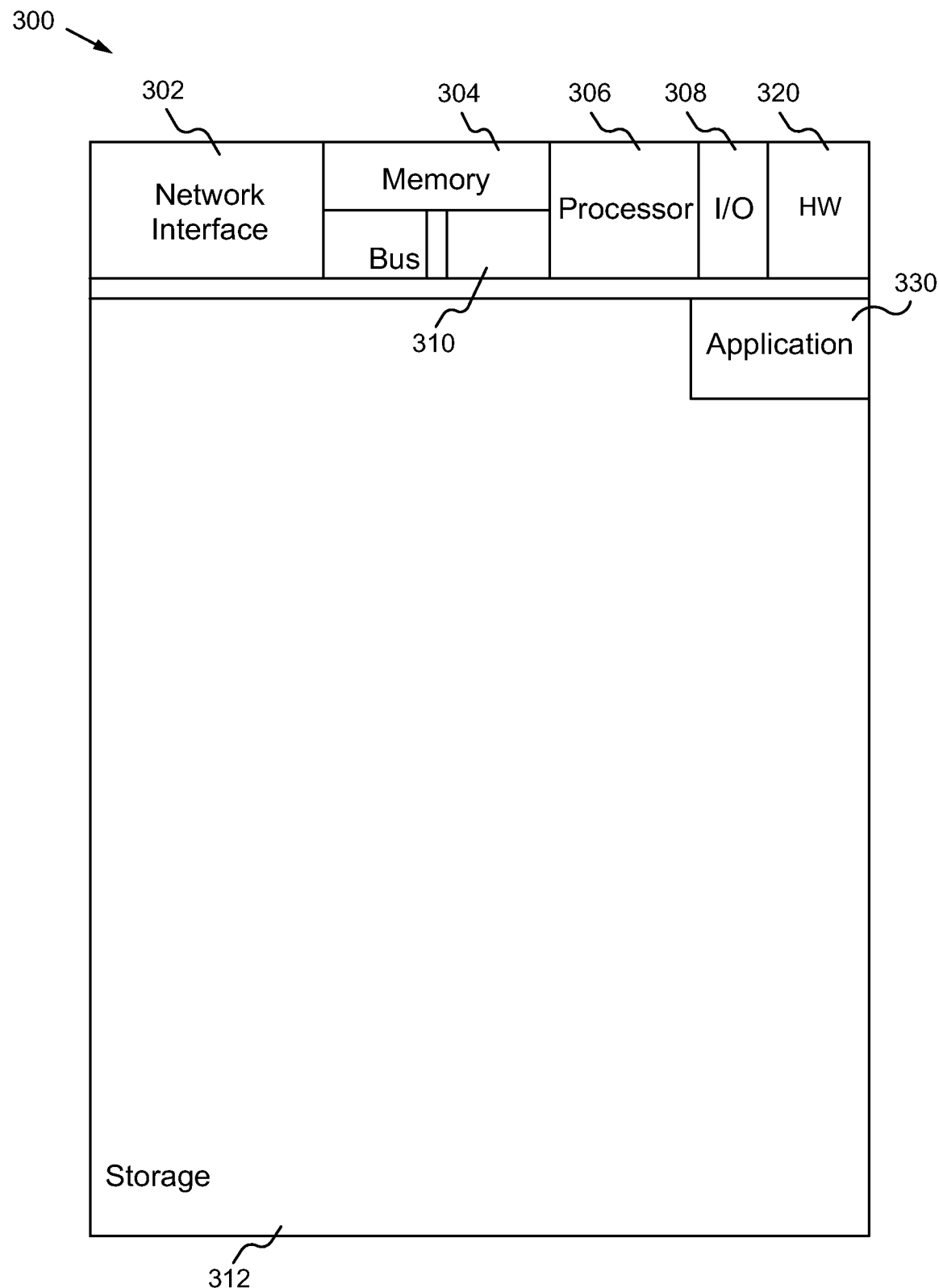
FIG. 3 illustrates a block diagram of an exemplary computing device configured to implement the efficient transmission method according to some embodiments.

FIG. 3 illustrates a block diagram of an exemplary computing device configured to implement the efficient transmission method according to some embodiments. The computing device 300 is able to be used to acquire, store, compute, process, communicate and/or display information such as images and videos including 3D content. The computing device 300 is able to implement any of the encoding/decoding aspects. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. A GPU is also able to be included. The memory 304 is able to be any conventional computer memory known in the art. The storage device 312 is able to include a hard drive, CDROM, CDRW, DVD, DVDRW, High Definition disc/drive, ultra-HD drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Efficient transmission application(s) 330 used to implement the efficient transmission implementation are likely to be stored in the storage device 312 and memory 304 and processed as applications are typically processed. More or fewer components shown in FIG. 3 are able to be included in the computing device 300. In some embodiments, efficient transmission hardware 320 is included. Although the computing device 300 in FIG. 3 includes applications 330 and hardware 320 for the efficient transmission implementation, the efficient transmission method is able to be implemented on a computing device in hardware, firmware, software or any combination thereof. For example, in some embodiments, the efficient transmission applications 330 are programmed in a memory and executed using a processor. In another example, in some embodiments, the efficient transmission hardware 320 is programmed hardware logic including gates specifically designed to implement the efficient transmission method.

In some embodiments, the efficient transmission application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

In some embodiments, the computing device is coupled to a camera or a camera system. In some embodiments, the device is stored locally, remotely or a combination thereof.

To utilize the efficient transmission method, a rigging vector (between each frame) is transmitted and then rigging is used on the server side to show the movement (e.g., acquiring a volumetric 3D video of a subject on the client side, and instead of transmitting the whole video, transmit just the rigging vector (e.g., a set of coefficients) to a server), where the server then uses the rigging vector to perform rigging and generate the same (or similar) video captured. The efficient transmission method is able to be implemented with user assistance or automatically without user involvement (e.g., by utilizing artificial intelligence).

In operation, the efficient transmission method enables more efficient volumetric 3D content transfer and is able to reduce utilized network bandwidth compared to previous implementations.

Some Embodiments of Efficient 5G Transmission of Volumetric Data Using 3D Character Rigging Techniques 1. A method programmed in a non-transitory memory of a device comprising:
    generating a plurality of 3D models from frames of volumetric 3D content;
    synthesizing frame models from the plurality of 3D models;
    comparing the synthesized frame models with the plurality of 3D models to calculate difference information between the synthesized frame models and the 3D models; and
    transmitting a first 3D model of the plurality of 3D models, the difference information and parameters to a server.
2. The method of clause 1 further comprising acquiring the volumetric 3D content.
3. The method of clause 1 wherein synthesizing the frame models from the plurality of 3D models further comprises accepting coefficients and the parameters from the frames to synthesize the frame models from the plurality of 3D models.
4. The method of clause 3 wherein generating the plurality of 3D models includes:
    generating the first 3D model from a first frame of the volumetric 3D content; and
    generating a second 3D model from a second frame of the volumetric 3D content.
5. The method of clause 4 wherein accepting coefficients and the parameters from the frames to synthesize the frame models includes: accepting the coefficients and the parameters from the frames at a rigging engine, and using an optimizer to synthesize a second frame model from the first 3D model.
6. The method of clause 1 wherein the server is further configured for utilizing rigging to re-generate the volumetric 3D content.
7. The method of clause 1 wherein the server is further configured for synthesizing a second frame model and additional frame models to re-generate the volumetric 3D content.
8. An apparatus comprising:
    a non-transitory memory for storing an application, the application for:
        generating a plurality of 3D models from frames of volumetric 3D content;
        synthesizing frame models from the plurality of 3D models;
        comparing the synthesized frame models with the plurality of 3D models to calculate difference information between the synthesized frame models and the 3D models; and
        transmitting a first 3D model of the plurality of 3D models, the difference information and parameters to a server; and
    a processor coupled to the memory, the processor configured for processing the application.
9. The apparatus of clause 8 wherein the application is further configured for: acquiring the volumetric 3D content.
10. The apparatus of clause 8 wherein synthesizing the frame models from the plurality of 3D models further comprises accepting coefficients and the parameters from the frames to synthesize the frame models from the plurality of 3D models.
11. The apparatus of clause 10 wherein generating the plurality of 3D models includes:
    generating the first 3D model from a first frame of the volumetric 3D content; and
    generating a second 3D model from a second frame of the volumetric 3D content.
12. The apparatus of clause 11 wherein accepting coefficients and the parameters from the frames to synthesize the frame models includes: accepting the coefficients and the parameters from the frames at a rigging engine, and using an optimizer to synthesize a second frame model from the first 3D model.

13. The apparatus of clause 8 wherein the server is further configured for utilizing rigging to re-generate the volumetric 3D content.
14. The apparatus of clause 8 wherein the server is further configured for synthesizing a second frame model and additional frame models to re-generate the volumetric 3D content.
15. A system comprising:
    a first computing device configured for:
        generating a plurality of 3D models from frames of volumetric 3D content;
        synthesizing frame models from the plurality of 3D models;
        comparing the synthesized frame models with the plurality of 3D models to calculate difference information between the synthesized frame models and the 3D models; and
        transmitting a first 3D model of the plurality of 3D models, the difference information and parameters; and
    a second computing device configured for:
        receiving the first model, difference information and the parameters; and
        utilizing rigging to re-generate the volumetric 3D content.
16. The system of clause 15 further comprising a set of cameras configured for acquiring the volumetric 3D content.
17. The system of clause 15 wherein synthesizing the frame models from the plurality of 3D models further comprises accepting coefficients and the parameters from the frames to synthesize the frame models from the plurality of 3D models.
18. The system of clause 17 wherein generating the plurality of 3D models includes:
    generating the first 3D model from a first frame of the volumetric 3D content; and
    generating a second 3D model from a second frame of the volumetric 3D content.
19. The system of clause 18 wherein accepting coefficients and the parameters from the frames to synthesize the frame models includes: accepting the coefficients and the parameters from the frames at a rigging engine, and using an optimizer to synthesize a second frame model from the first 3D model.
20. The system of clause 15 wherein the server is further configured for synthesizing a second frame model and additional frame models to re-generate the volumetric 3D content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
    generating a plurality of 3D models from frames of volumetric 3D content;
    synthesizing frame models from the plurality of 3D models;
    comparing the synthesized frame models with the plurality of 3D models to calculate difference information between the synthesized frame models and the 3D models; and
    transmitting a first 3D model of the plurality of 3D models, the difference information and parameters to a server, wherein the parameters comprise a rigging vector, wherein the rigging vector is transmitted between each frame, and the server approximates an optimal set of vectors for a next frame based on the rigging vector.
2. The method of claim 1 further comprising acquiring the volumetric 3D content.
3. The method of claim 1 wherein synthesizing the frame models from the plurality of 3D models further comprises accepting coefficients and the parameters from the frames to synthesize the frame models from the plurality of 3D models.
4. The method of claim 3 wherein generating the plurality of 3D models includes:
    generating the first 3D model from a first frame of the volumetric 3D content; and
    generating a second 3D model from a second frame of the volumetric 3D content.
5. The method of claim 4 wherein accepting coefficients and the parameters from the frames to synthesize the frame models includes: accepting the coefficients and the parameters from the frames at a rigging engine, and using an optimizer to synthesize a second frame model from the first 3D model.
6. The method of claim 1 wherein the server is further configured for utilizing rigging to re-generate the volumetric 3D content.
7. The method of claim 1 wherein the server is further configured for synthesizing a second frame model and additional frame models to re-generate the volumetric 3D content.
8. An apparatus comprising:
    a non-transitory memory for storing an application, the application for:
        generating a plurality of 3D models from frames of volumetric 3D content;
        synthesizing frame models from the plurality of 3D models;
        comparing the synthesized frame models with the plurality of 3D models to calculate difference information between the synthesized frame models and the 3D models; and
        transmitting a first 3D model of the plurality of 3D models, the difference information and parameters to a server, wherein the parameters comprise a rigging vector, wherein the rigging vector is transmitted between each frame, and the server approximates an optimal set of vectors for a next frame based on the rigging vector; and
    a processor coupled to the memory, the processor configured for processing the application.
9. The apparatus of claim 8 wherein the application is further configured for:
    acquiring the volumetric 3D content.
10. The apparatus of claim 8 wherein synthesizing the frame models from the plurality of 3D models further comprises accepting coefficients and the parameters from the frames to synthesize the frame models from the plurality of 3D models.
11. The apparatus of claim 10 wherein generating the plurality of 3D models includes:

generating the first 3D model from a first frame of the volumetric 3D content; and generating a second 3D model from a second frame of the volumetric 3D content.

12. The apparatus of claim 11 wherein accepting coefficients and the parameters from the frames to synthesize the frame models includes: accepting the coefficients and the parameters from the frames at a rigging engine, and using an optimizer to synthesize a second frame model from the first 3D model.

13. The apparatus of claim 8 wherein the server is further configured for utilizing rigging to re-generate the volumetric 3D content.

14. The apparatus of claim 8 wherein the server is further configured for synthesizing a second frame model and additional frame models to re-generate the volumetric 3D content.

15. A system comprising:
a first computing device configured for:
   generating a plurality of 3D models from frames of volumetric 3D content;
   synthesizing frame models from the plurality of 3D models;
   comparing the synthesized frame models with the plurality of 3D models to calculate difference information between the synthesized frame models and the 3D models; and
   transmitting a first 3D model of the plurality of 3D models, the difference information and parameters; and
a second computing device configured for:
   receiving the first model, difference information and the parameters; and
   utilizing rigging to re-generate the volumetric 3D content, wherein the parameters comprise a rigging vector, wherein the rigging vector is transmitted between each frame, and the second computing device approximates an optimal set of vectors for a next frame based on the rigging vector.

16. The system of claim 15 further comprising a set of cameras configured for acquiring the volumetric 3D content, wherein the volumetric 3D content comprises moving 3D content.

17. The system of claim 15 wherein synthesizing the frame models from the plurality of 3D models further comprises accepting coefficients and the parameters from the frames to synthesize the frame models from the plurality of 3D models.

18. The system of claim 17 wherein generating the plurality of 3D models includes:
generating the first 3D model from a first frame of the volumetric 3D content; and
generating a second 3D model from a second frame of the volumetric 3D content.

19. The system of claim 18 wherein accepting coefficients and the parameters from the frames to synthesize the frame models includes: accepting the coefficients and the parameters from the frames at a rigging engine, and using an optimizer to synthesize a second frame model from the first 3D model including compensating for differences based on the difference information.

20. The system of claim 15 wherein the server is further configured for synthesizing a second frame model and additional frame models to re-generate the volumetric 3D content.

* * * * *